United States Patent [19]

Bradley

[11] 3,943,955
[45] Mar. 16, 1976

[54] STABILIZATION OF WASTE MATERIAL

[75] Inventor: Earl H. Bradley, Seekonk, Mass.

[73] Assignee: General Signal Corporation, Rochester, N.Y.

[22] Filed: Sept. 3, 1974

[21] Appl. No.: 502,687

Related U.S. Application Data

[60] Continuation of Ser. No. 383,714, July 30, 1973, abandoned, which is a division of Ser. No. 242,989, April 11, 1972, abandoned.

[52] U.S. Cl. .................. 137/14; 137/565; 137/566
[51] Int. Cl.² .......................................... F04D 13/16
[58] Field of Search ...................... 137/565, 566, 14

[56] References Cited
UNITED STATES PATENTS

| | | | |
|---|---|---|---|
| 3,269,401 | 8/1966 | Scott et al. | 137/566 X |
| 3,292,647 | 12/1966 | Scott | 137/566 X |
| 3,300,402 | 1/1967 | Grich et al. | 210/15 X |
| 3,367,153 | 2/1968 | Brubaker et al. | 137/114 X |
| 3,751,179 | 8/1973 | Wassmann | 415/152 A |
| 3,757,813 | 9/1973 | Levenberg | 137/423 X |
| 3,773,432 | 11/1973 | Chow et al. | 415/152 A |

Primary Examiner—Alan Cohan
Assistant Examiner—Gerald A. Michalsky
Attorney, Agent, or Firm—Harold Huberfeld; Jeffrey S. Mednick

[57] ABSTRACT

A process and apparatus for stabilizing waste material, preferably of the type that has been subjected to an initial treatment process, is disclosed and includes a main reaction tank into which the waste material is pumped after having been mixed with a suitable oxidizing agent. In the main reaction tank the mixture undergoes a chemical oxidation reaction and is then discharged through the top of the tank. A significant portion of the mixture so discharged is mixed with new waste material and an additional amount of the oxidizing agent and the new mixture is circulated back through the main reaction tank where the oxidation reaction continues; the remaining portion of the mixture is circulated through a secondary reaction tank similar to the first. Pressure is maintained in the secondary reaction tank by a suitable mechanism so that the oxidation reaction continues at a relatively high rate and the oxidized mixture is discharged as stabilized sludge through the top of the tank to a suitable sludge dewatering apparatus. In one particular embodiment of the invention, the mechanism maintaining the pressure in the secondary reaction tank includes a pump running in opposition to the direction of sludge flow but at a pressure insufficient to stop the flow.

8 Claims, 1 Drawing Figure

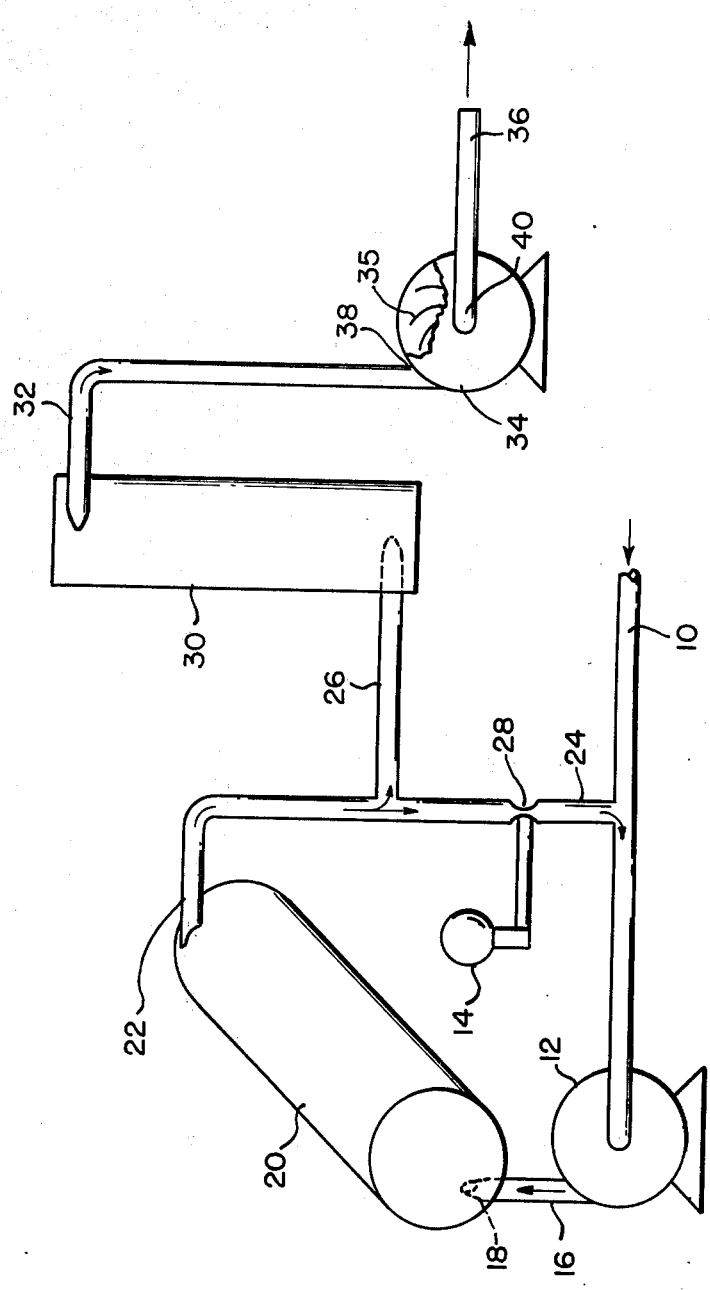

STABILIZATION OF WASTE MATERIAL

This is a continuation of application Ser. No. 383,714, filed July 30, 1973, now abandoned, which application is a division of application Ser. No. 242,989, filed Apr. 11, 1972, now abandoned.

This invention relates to an improved process and apparatus for the stabilization of putrescible unstable wastes, that is, treating the wastes to a point where further chemical change will occur at a very slow rate thereby rendering the wastes non-odor forming and providing a reduction in its biological oxygen demand. More particularly, this invention relates to an improvement in the process and apparatus described in U.S. Pat. No. 3,300,402, issued to Grich et al. on Jan. 24, 1967.

In the above-identified Grich et al. patent there is disclosed a process and apparatus for stabilizing putrescible unstable waste material which invloves the initial treatment of the waste in any suitable manner to provide a sludge that is mixed with an oxidizing agent and pumped through a series of internally unobstructed reaction tanks wherein a chemical oxidation reaction occurs. While the process and apparatus described in the Grich et al. patent works in a generally satisfactory manner, it should be noted that the last reaction tank in the series maintains the mixture of sludge and the oxidizing agent at an extremely low pressure so that oxidation takes place at a relatively slow rate. It has been determined that in certain instances the oxidizing agent being added requires more time to react with the sludge than that provided by the system disclosed in the Grich et al. patent so that the oxidation process is not completed to an adequate degree in the reaction tanks. Consequently, inadequately stabilized sludge can be discharged from the last reaction tank.

One proposed solution to the problem of discharging inadequately stabilized sludge was to add more reaction tanks to the system, but such a solution involved the additional expense of the added reaction tanks. Moreover, since the last tank in the series disclosed in the Grich et al. patent does not maintain the mixture under a significant pressure, neither did the added tanks so that the reaction time and, consequently, the degree of stabilization was not significantly improved.

Another proposed solution to the above noted problem was to increase the size of the reaction tanks. As in the case of providing additional reaction tanks, increasing the size of the tanks involved expense out of proportion to the increase in reaction time.

According to one aspect of this invention, however, sufficient oxidation reaction time is provided in an economical and effective manner whereby the oxidation reaction takes place to an adequate degree prior to discharge of the mixture from the system. Briefly, this is accomplished by providing a plurality, preferably two, of internally unobstructed reaction tanks, a pump having its intake port communicating with a mechanism for metering chemical oxidizing agent into a conduit connected to a system for initially treating the waste and having its discharge port connected to the first tank through a tangential inlet nozzle, a first discharge conduit connecting the first and second tanks and including a branch communicating through a pressure maintaining mechanism to the conduit on the suction side of the pump, and a second discharge conduit connected to the second tank and also including a pressure maintaining mechanism. In operation, the pump discharges a mixture including waste from the initial treatment system and chemical oxidizing agent into the first reaction tank where an oxidation reaction occurs. The resulting sludge is discharged from the first tank and a major portion is fed back to the pump where it is mixed with fresh waste from the initial treatment system and additional oxidizing agent and is recirculated through the first reaction tank, the remaining portion of the sludge discharged from the first reaction tank is fed into the second reaction tank where the oxidation process continues at a relatively fast rate because the pressure is maintained with only a slight drop from that in the first reaction tank.

Another aspect of the invention relates to pressure maintaining mechanism utilized in the second discharge conduit. Conventional pressure maintaining mechanisms such as flow restrictors and pressure relief valves are subject to clogging by the solids contained in waste material except where the flow rate is high enough to allow the use of large size apparatus. The flow rate from the second reaction tank is too low to allow the use of such large sized apparatus and thus frequent and costly cleaning of the conventional pressure maintaining mechanisms would be required. However, according to this other aspect of the invention, the clogging problem is obviated by providing a pump running in opposition to the direction of the sludge flow but at a pressure insufficient to overcome the flow of said sludge. Accordingly, pressure in the second reaction tank is maintained.

For a better understanding of the invention, reference is made to the accompanying drawing in which there is diagrammatically illustrated a system for treating sludge in accordance with this invention.

Referring specifically now to the drawing, there is disclosed an inlet conduit 10 that connects the intake port of a feed pump 12 with any suitable source of waste material to be stabilized. It should be understood that the term waste material is intended to include raw waste and sewage or sludge discharged from any system for the initial treatment of raw waste or sewage. The latter category includes by way of example, the effluent from a primary clarifier or secondary sludge from an aerobic treatment process and secondary clarifier, or could be incompletely digested sludge discharged from an anaerobic digester, or could be a combination of the three. For the purposes of this invention, the initial treatment to which the raw waste or sewage has been subjected is immaterial.

A supply chamber 14 including the usual flow control devices contains a suitable oxidizing agent and is located on the intake side of pump 12 so that the oxidizing agent, preferably in the form of gas and preferably chlorine, is introduced to the waste material in conduit 10. As will be explained hereinafter, feeding mechanism 14 communicates with conduit 10 through a conduit 24 and a flow restriction 28. As will also be explained more fully hereinafter, flow restriction 28 functions as a pressure maintaining device, and in the preferred embodiment is in the form of an eductor having a nozzle shaped flow restriction and a suction chamber. Educators of this type are commercially available and when used herein also function to evacuate the oxidizing agent from supply chamber 14 and into conduit 24. Use of the eductor is preferred especially when the oxidizing agent is chlorine gas since it provides a safety function. While the use of chlorine gas is preferred, it should be noted that various other suitable oxidizing agents can be utilized. Pump 12 is preferably of the centrifugal type having a recessed impeller to prevent clogging and agitates the waste material and oxidizing agent in the pumping chamber so that they are thoroughly and intimately mixed. The mixture of waste material and oxidizing agent is discharged from pump 12 in a conduit 16, through a nozzle 18 and into a first reaction tank 20 which is internally free of obstructions and which has a generally cylindrical configuration. Nozzle 18 is located tangentially with respect to reaction tank 20 and causes only a slight pressure drop in the mixture. Since it is discharged at high velocity, the mixture circulates in a spiral path around the outer wall of the tank and undergoes a chemical oxidation reaction. Although not necessary for the practice of the invention, the longitudinal axis of tank 20 is disposed in a horizontal plane to conserve space in the installation of the system.

A discharge conduit 22 is, of course, connected to the end of tank 20 opposite the inlet end and may be located in any angular position with respect to the tank. Preferably, however, discharge conduit 22 is located at the top of tank 20 to facilitate the escape of gas which may have formed during the oxidation reaction or during periods when the system is shut down. Discharge conduit 22 splits into two branches 24 and 26 with the former being connected through flow restrictor 28 to inlet conduit 10 and with the latter being connected to a second reaction tank 30. Branches 24 and 26 are arranged such that a major portion of the mixture discharged from tank 20 is fed to conduit 10 and only a minor portion is discharged to tank 30. Restriction 28 maintains the pressure in reaction tank 20 so that the rapid oxidation action can occur therein.

At this point it should be noted that the mixture discharged from tank 20 is mixed with additional oxidizing agent in flow restriction 28, flows through branch 24 and into conduit 10 wherein it is mixed with new waste material to be stabilized and is recirculated through tank 20. With this arrangement additional oxidation reaction time is provided for a major portion of the waste material being stabilized. While the portion to be recirculated can vary, satisfactory results have been obtained when at least 75% of the waste material is recirculated; for optimum results, however, about 85% of the waste material should be recirculated.

Secondary reaction tank 30 is similar to tank 20, that is, it is cylindrical, is internally free from obstructions and is tangentially connected with its inlet, branch 26. Accordingly, the portion of the mixture discharged from tank 20 to tank 30 again circulates in a spiral path around the walls of the tank, and is discharged through a discharge conduit 32 located, preferably, at the top of the tank to facilitate the escape of gas. Tank 30 is preferably disposed vertically so that solids that have settled in the bottom of the tank during shut down periods can be easily picked up by the flow of the mixture when the system is restarted. Conduit 32 includes a suitable mechanism for maintaining pressure in the tank 30 so that the oxidation reaction continues in the mixture discharged from tank 20. While various pressure maintaining mechanisms could be utilized, the preferred type includes a pump 34 running in opposition to the flow of the mixture as will be more fully explained hereinafter. It should be noted that the pressure drop between first reaction tank 20 and second reaction tank 30 is as small as possible so that the oxidation reaction continues at the desired rate. Preferably the pressure drop is just small enough to allow the mixture to flow from the first to the second tank. The mixture discharged from tank 30 is stabilized sludge which is carried through a conduit 36 to a suitable dewatering apparatus.

From the preceding description of a preferred embodiment it can be seen that sufficient oxidation reaction time is provided for assuring adequate stabilization of waste material by recirculating a major portion of the mixture and by maintaining pressure on the mixture throughout the entire oxidation reaction. Recirculation, of course, increases the reaction time of a significant volume of the mixture and circulation under pressure in the second tank assures that any portion of the mixture not recirculated is provided with adequate additional reaction time. Other significant advantages are also realized in that only two tanks need be utilized, the second one being of a relatively small size, thus lowering the installation cost of the system and also in the fact that the process is continuous thus lowering the operating cost.

As pointed out previously, the pressure maintaining mechanism utilized in the preferred embodiment of the invention includes pump 34 running in opposition to the flow of the mixture discharged from tank 30. Flow restrictions or pressure relief valves could be utilized, but at the low flow rates at which the mixture is discharged these mechanisms are susceptible to clogging by the solids contained in the mixture. Referring back to the drawing, pump 34 is preferably of the centrifugal type having a recessed impeller 35 to avoid clogging. The pump is connected so that its usual discharge port becomes an intake port 38 and so that its usual intake port becomes a discharge port 40; however, the curvature of the impeller is not altered from the usual configuration of directing fluid out of the pump through port 38. In operation, impeller 35 is driven in its usual manner so that it is working against the direction of flow of the mixture being discharged through conduit 32, but at a speed which provides pressure less than that in tank 30. Accordingly, flow of the mixture is not stopped, but it flows through the pump in a manner reverse that of the usual operation of the pump. In addition to obviating the clogging problem, use of the pump arrangement is also economical since it is operating in an almost shut down condition and its power requirements are minimal.

EXAMPLES

Tests were conducted at a municipal sewage treatment plant yielding activated sludge which was fed to and discharged from the system described above at the rate of 10 gallons per minute. The feed pump raised the pressure of the mixture to 35 p.s.i. (pounds per square inch) and the inlet nozzle caused a 10 p.s.i. pressure drop. Accordingly, 25 p.s.i. was maintained on the mixture in the first reaction tank and only slightly less than that in the second reaction tank. About 85 percent of the mixture discharged from the first reaction tank was recirculated.

In one test chlorine gas was fed to the system at the rate of 1790 p.p.m. (parts per million). When discharged from the first reaction tank the residual or unconsumed chlorine was measured at 430 p.p.m. and the relative stability of the mixture was calculated at 99 percent. When discharged from the second reaction tank the chlorine residual was measured at 390 and the relative stability of the mixture was again calculated at 99 percent. Relative stability is the ratio of the oxygen available in the waste to that required for complete oxidation of the organic matter in the waste material. The higher the percentage, the more stable the mixture.

In another test chlorine gas was fed to the system at the rate of 1210 p.p.m. and the residuals measured at the discharge of the first and second tanks were 250 p.p.m. and 240, respectively. The relative stability of the mixture discharged from the first tank was calculated at 84 percent and from the second tank at 90 percent.

Finally, in still another test chlorine gas was fed to the system at the rate of 600 p.p.m. and the residuals measured at the discharge of the first and second tanks were 130 p.p.m. and 120 p.p.m., respectively. The relative stability of the mixture discharged from the first tank was calculated at 75 percent and from the second tank at 87 percent.

During the tests it was also determined that the highest relative stability at which chemical change could occur at an unsatisfactory rate was 84 percent. Thus, any of the chlorine feed rates mentioned above would yield satisfactory results. In fact, with a feed rate of 1790 p.p.m., a satisfactory degree of stabilization could be obtained with only one reaction tank. However, lowering the feed rate yields greater operating economy in that less chlorine is consumed and the degree of stabilization is satisfactory. The preferred feed rate is 1210 p.p.m. since great operating economy is realized while maintaining a relative stability of 90 percent at the discharge from the second tank and providing a suitable safety margin over the critical 84 percent.

While there has been described a preferred embodiment of the invention, it should be understood that various modifications may become apparent to those skilled in the art. Accordingly, the scope of the invention is not limited to the exact system illustrated above, but should be ascertained from the appended claims.

What is claimed is:

1. In a system, a first conduit means connected to an inlet port of a tank, source means connected to said first conduit means for delivering pressurized fluid to said tank, a second conduit means connected to an outlet port of said tank for directing said fluid from said tank, the improvement comprising:
   impeller means in said second conduit means for permitting said pressurized fluid to flow from said source means, through said inlet port, said tank, said outlet port, and said impeller means while simultaneously maintaining pressure in said tank, said impeller means comprising a rotatable impeller tending to oppose the flow of said fluid from said tank while said source means delivers pressurized fluid to said tank.

2. The system as defined in claim 1 wherein said impeller means comprises a pump means rotating in a direction tending to move said fluid from said pump means to said tank while said source means delivers pressurized fluid to said tank.

3. The system as defined in claim 1, wherein said source means includes a pump pressurizing said fluid.

4. The system as defined in claim 3, wherein said pump is a centrifugal pump.

5. A method of maintaining pressure in a tank comprising the steps of:
   1. supplying a pressurized fluid to an inlet port of a tank;
   2. directing said pressurized fluid from an outlet port of said tank into a conduit; and
   3. permitting flow through said inlet port, said tank, said outlet port, and a rotatable impeller while simultaneously maintaining pressure in said tank by engaging said rotatable impeller in said conduit in a manner tending to oppose the flow of said fluid from said tank to said conduit.

6. The method as set forth in claim 5 wherein the step of engaging said rotatable impeller comprises rotating a pump in said conduit in a direction tending to move said fluid from said pump to said tank.

7. The method as set forth in claim 1, wherein said pressurized fluid is supplied by actuating an inlet pump.

8. The method as set forth in claim 7, wherein said pumps are centifugal.

* * * * *